United States Patent
Lee

(10) Patent No.: US 8,793,380 B2
(45) Date of Patent: Jul. 29, 2014

(54) CLOUD SERVICE CONTROL AND MANAGEMENT ARCHITECTURE EXPANDED TO INTERFACE THE NETWORK STRATUM

(75) Inventor: Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/524,988

(22) Filed: Jun. 15, 2012

(65) Prior Publication Data

US 2012/0324082 A1    Dec. 20, 2012

Related U.S. Application Data

(60) Provisional application No. 61/498,337, filed on Jun. 17, 2011.

(51) Int. Cl.
*G06F 15/173* (2006.01)

(52) U.S. Cl.
USPC ............................ 709/226; 709/223; 709/238

(58) Field of Classification Search
USPC .................................. 709/223, 220, 238, 226
See application file for complete search history.

(56) References Cited

U.S. PATENT DOCUMENTS

| | | | |
|---|---|---|---|
| 6,314,093 B1 | 11/2001 | Mann et al. | |
| 7,636,764 B1 | 12/2009 | Fein et al. | |
| 8,214,499 B2 | 7/2012 | Batabyal et al. | |
| 8,250,213 B2 | 8/2012 | Glover et al. | |
| 2011/0029882 A1* | 2/2011 | Jaisinghani | 709/223 |
| 2011/0096762 A1* | 4/2011 | Basart | 370/338 |
| 2011/0126168 A1* | 5/2011 | Ilyayev | 717/103 |
| 2011/0126197 A1* | 5/2011 | Larsen et al. | 709/223 |
| 2011/0153829 A1* | 6/2011 | Kwon et al. | 709/226 |
| 2011/0173108 A1* | 7/2011 | Rajasekar et al. | 709/225 |
| 2011/0307947 A1* | 12/2011 | Kariv et al. | 726/9 |
| 2012/0054346 A1 | 3/2012 | Lee et al. | |
| 2012/0089726 A1* | 4/2012 | Doddavula | 709/224 |
| 2012/0185913 A1* | 7/2012 | Martinez et al. | 726/1 |

(Continued)

FOREIGN PATENT DOCUMENTS

EP            1094650 A2      4/2001

OTHER PUBLICATIONS

Seedorf, J., et al., "Application-Layer Traffic Optimization (ALTO) Problem Statement," RFC 5693, Oct. 2009, 14 pages.

(Continued)

*Primary Examiner* — Philip B Tran
(74) *Attorney, Agent, or Firm* — Conley Rose, P.C.; Grant Rodolph; Brandt Howell

(57) ABSTRACT

Disclosed is a method comprising: transmitting, by a cloud service control gateway (CSCG) positioned in an application stratum, a resource query to a network control gateway (NCG) positioned in a network stratum, wherein the resource query comprises a source address, a destination address list, and a network resource requirement. Also disclosed is a method comprising: receiving, by a network control gateway (NCG) positioned in a network stratum, a resource query from a cloud service control gateway (CSCG) positioned in an application stratum, wherein the resource query comprises source address, a destination address list, and a network resource requirement. Also disclosed is a method comprising: receiving, by a network control gateway (NCG) positioned in a network stratum, a resource reservation request from a cloud service control gateway (CSCG) positioned in an application stratum, wherein the resource reservation request comprises a destination address list and a first network resource requirement.

22 Claims, 12 Drawing Sheets

(56) References Cited

U.S. PATENT DOCUMENTS

| | | | |
|---|---|---|---|
| 2012/0198036 A1* | 8/2012 | Korovin et al. | 709/223 |
| 2012/0221845 A1* | 8/2012 | Ferris | 709/226 |
| 2012/0311157 A1* | 12/2012 | Erickson et al. | 709/226 |
| 2013/0080642 A1* | 3/2013 | Adam et al. | 709/226 |

OTHER PUBLICATIONS

Office Action dated Mar. 28, 2012, 21 pages, U.S. Appl. No. 13/525,006, filed Jun. 15, 2012.
Alimi, Ed., et al., "ALTO Protocol," draft-ietf-alto-protocol-11.txt, Mar. 11, 2012, 68 pages.
Vasseur, Ed., et al., "Path Computation Element (PCE) Communication Protocol (PCEP)," RFC 5440, Mar. 2009, 87 pages.
Le Roux, Ed., et al., "OSPF Protocol Extensions for Path Computation Element (PCE) Discovery," RFC 5088, Jan. 2008, 20 pages.
Le Roux, Ed., et al., "IS-IS Protocol Extensions for Path Computation Element (PCE) Discovery," RFC 5089, Jan. 2008, 17 pages.
Foreign Communication From a Counterpart Application, PCT Application No. PCT/US2012/042768, International Search Report mailed Sep. 10, 2012, 4 pages.
Foreign Communication From a Counterpart Application, PCT Application No. PCT/US2012/042768, Written Opinion mailed Sep. 10, 2012, 5 pages.
Foreign Communication From a Counterpart Application, PCT Application No. PCT/US2012/042759, International Search Report mailed Sep. 10, 2012, 4 pages.
Foreign Communication From a Counterpart Application, PCT Application No. PCT/US2012/042759, Written Opinion mailed Sep. 10, 2012.
Notice of Allowance dated Sep. 25, 2013, 6 pages, U.S. Appl. No. 13/525,006, filed Jun. 15, 2012.
Lee, Y., et al., "Research Proposal for Cross Stratum Optimization (CSO) Between Data Centers and Networks," Network Working Group, Internet Draft, draft-lee-cross-stratum-optimization-datacenter-00.txt., Mar. 3, 2011, 16 pages.
International Telecommunication Union, Telecommunication Standardization Sector, Study Period 2009-2012, Study Group 13, Questions 4/13, TD 194 (WP 4/13), "Output-Draft Recommendation of 'Resource Control and Management for Virtual Networks for Cloud Services (VCNs)' (version 0.4)," Geneva, Oct. 10-21, 2011, 6 pages.
Office Action dated Aug. 12, 2013, 20 pages, U.S. Appl. No. 13/525,006, filed Jun. 15, 2012.

\* cited by examiner

CLOUD SERVICE CONTROL AND MANAGEMENT ARCHITECTURE EXPANDED TO INTERFACE THE NETWORK STRATUM

CROSS-REFERENCE TO RELATED APPLICATIONS

The present application claims priority to U.S. Provisional Patent Application 61/498,337, filed Jun. 17, 2011 by Young Lee, and entitled "Cloud Service Control and Management Architecture Expanded to Interface the Network Stratum," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network carriers, also sometimes referred to as telecommunications operators or communications service providers, that run existing networks desire to optimize network utilization for passing traffic, such as Internet Protocol (IP) traffic, over the physical portion of the network, e.g., across the network layers 1 to 5. The optimized traffic may include traffic for triple play services (e.g., Video, Voice, and/or Data) and any type of bulk data. In existing networks, end-to-end services are typically set-up by Operational Support Systems (OSS) systems or provider specific network management service applications. Network carriers have suggested two different scenarios for optimizing network utilization and traffic: optimizing existing network services and enabling new/emerging network application services.

SUMMARY

In one embodiment, the disclosure includes a method comprising: transmitting, by a cloud service control gateway (CSCG) positioned in an application stratum, a resource query to a network control gateway (NCG) positioned in a network stratum, wherein the resource query comprises a source address, a destination address list, and a network resource requirement.

In another embodiment, the disclosure includes a method comprising: receiving, by a NCG positioned in a network stratum, a resource query from a CSCG positioned in an application stratum, wherein the resource query comprises a source address, a destination address list, and a network resource requirement.

In yet another embodiment, the disclosure includes a method comprising: receiving, by a network control gateway (NCG) positioned in a network stratum, a resource reservation request from a cloud service control gateway (CSCG) positioned in an application stratum, wherein the resource reservation request comprises a destination address list and a first network resource requirement.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
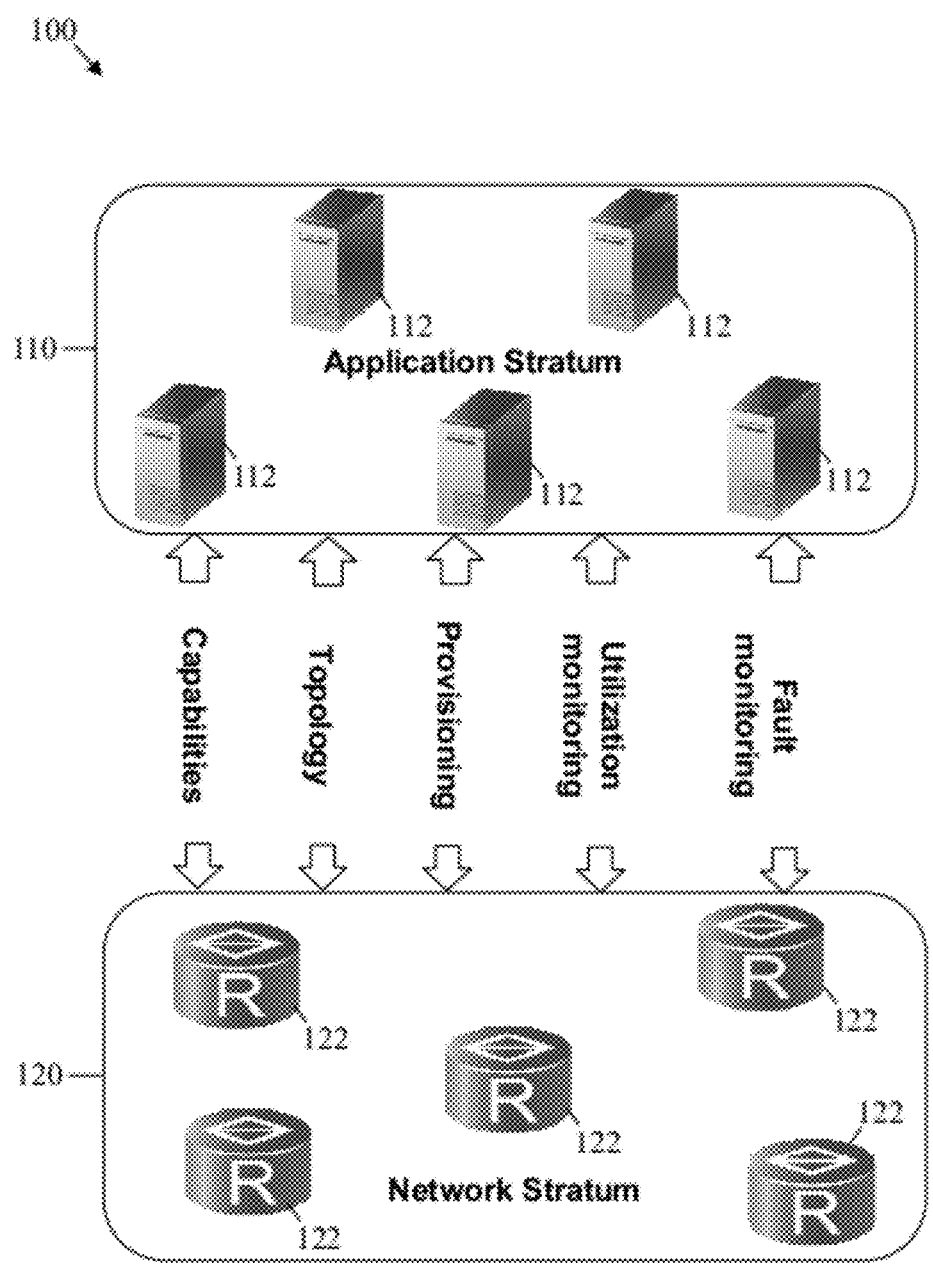
FIG. 1 is a schematic diagram of an embodiment of a Cross Stratum Optimization (CSO) architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The provisioning and operation of new/emerging applications, such as cloud computing, may involve provisioning processing resources and/or storage space on multiple network components (e.g. servers). Based on the changing needs of a user, resources/data may be migrated between servers. The network may be divided into an application stratum and a network stratum. The application stratum may include the applications and services implemented or running over the network layer, and the network stratum may include the transport, network, link, and physical layers or combinations thereof. Services operating in the application stratum may be aware of available server resources, but may not be aware of network topology and resources. Services operating in the network stratum may be aware of network topology and resources, but not server resources. Services operating in either stratum may be unable to select optimal destination server for data/resource migration due to lack of complete information, resulting in a server selection (SS) problem. Because of strict separation between the strata, handling and coordinating service provisioning across both the application stratum and the network stratum is different from handling traditional services, such as network provisioning of end-to-end telecommunications services.

Disclosed herein is a system and method for providing Cross Stratum Optimization (CSO) to the SS problem. A Cloud Service Control Gateway (CSCG) in the application stratum may maintain application resource data for various servers, which may be located in various data centers (DCs). Application resource data may comprise a server's random access memory (RAM) utilization, power consumption, central processing unit (CPU) utilization, etc. A source may request that the CSCG perform a data migration. The CSCG may use the application resource data to generate a list of servers that may be suitable destinations for the data migration. The CSCG may transmit the list of destinations to a network control gateway (NCG) in the network stratum via a cross stratum interface. The CSCG may also transmit one or more network resource requirements to the NCG for use in further optimization. The network resource requirements may comprise maximum latency, minimum/maximum bandwidth, etc. The NCG may use network components, such as a path computation element (PCE), to compute optimal network paths between the source and each destination as well as associated network resource data for each path. The NCG may filter out destinations with paths or path links with network resource data that do not meet the network resource requirements from the CSCG. The NCG may send a network resource map of destinations to the CSCG along with associated path network resource data for SS. Additionally, the network resource map may include all links in each path and the network resource data for each path, each link of each path, or the entire network topology. The CSCG may use the information from the NCG to select a server and/or manage data migration from the source to the selected server. In another embodiment, the NCG may receive the information from the CSCG, determine the optimal path, reserve the path, and inform the CSCG of the reserved path. The CSCG may use the information to manage data migration to the server selected by the NGW.

Some of the terms used herein and described below with respect to CSO features include: application resources, application service, CSCG, network resources, a NCG, network stratum, and application stratum. The application resources may comprise non-network resources that may be critical to achieving the application service functionality. For example, the application resources may include computing resources and content resources such as caches, mirrors, application specific servers, virtual machines, memory, disk space, large data sets, video data, audio data, databases, and/or other resource related applications. The application service may be any networked application offered to a variety of clients. The CSCG may be a CSO entity in the application stratum that is responsible for gathering application resources load and utilization, making resource allocation decisions, and interacting with the NCG. The CSCG may be implemented on a processor of a network element such as a server or a network control entity. The CSCG may be positioned in a data center and may or may not be implemented on the same server as an NCG. The network resources may comprise resources of any layer 3 or lower layer, such as bandwidth, links, paths, path processing (e.g., creation, deletion, and management), network databases, path computation, and the routing and signaling protocols for creating paths. The NCG may be a CSO entity in the network stratum that is responsible for interacting with the CSCG, triggering service request function to transport network entity responsible for provisioning, configuration, path estimation/computation and other network management/control functions. The NCG may be implemented on a processor of a network element such as a server or a network control entity. The network stratum may comprise components and/or functions that operate on or below the network layer in the seven layer Open Systems Interconnect (OSI) model, such as Multiprotocol Label Switching (MPLS), Synchronous Digital Hierarchy (SDH), Optical Transport Network (OTN), wavelength-division multiplexing (WDM). The application stratum may comprise components and/or functions that operate at or above the transport layer of the seven layer OSI model.

FIG. 1 is a schematic diagram of an embodiment of a CSO architecture 100. The CSO architecture 100 may comprise an application stratum 110 and a network stratum 120. The application stratum 110 may comprise a plurality of servers 112, which may be configured to implement or run applications for end-users or customers (not shown). The network stratum 120 may comprise a plurality of network nodes 122, such as bridges, routers, and/or switches, for forwarding data, e.g., packets, associated with the applications. The servers 112 may be located in a data center and the network nodes 122 may be located in a network coupled to the data center. The servers 112 may communicate with the network nodes 122 to enable servicing the user applications and forwarding or transporting the associated data. The CSO architecture 100 may be implemented to optimize the different operations of the servers 112 and the network nodes 122.

In an embodiment, the data centers used to provide application services, such as cloud computing and other cloud services, at the application stratum 110 to the end-users may be distributed geographically around the network stratum 120. Thus, many decisions made in the control and management of application services, such as where to instantiate another service instance or to which data center a new client is assigned, may have a significant impact on the state of the network. The capabilities and state of the network may also have an impact on application performance.

Currently application decisions may be made with little or no information concerning the underlying network used to deliver those services. Hence, such decisions may be suboptimal from both application and network resource utilization and from the achievement of Quality of Service (QoS) objectives. A CSO architecture, such as CSO architecture 100 may provide a method and system to coordinate resource allocation between the application stratum 110 and the network stratum 120, e.g., in the context of cloud computing and data center networks. For instance, the CSO architecture 100 may support network stratum 110 query from application, joint provisioning between application and network, and/or joint re-allocation of resources upon anomaly in both application and network. The CSO architecture 100 may also provide application-aware network and network-aware application and global load balancing capability.

Some of the objectives for optimizing the operations and/or interactions between the application stratum 110 and the network stratum 120, e.g., between the servers 112 and the network nodes 122, may include improving network capabilities, topology, provisioning, utilization monitoring, fault monitoring, or combinations thereof. For instance, the CSO architecture 100 may improve the exchange of either or both network capabilities or application demand/resource information, topology and/or traffic-engineering related information between the layers (virtualization/abstraction), or both. The CSO architecture 100 may also improve initiating service instantiation of application to network with profile exchange (provisioning), exchanging application/network congestion/failure information (monitoring), or both.

Figure 2:
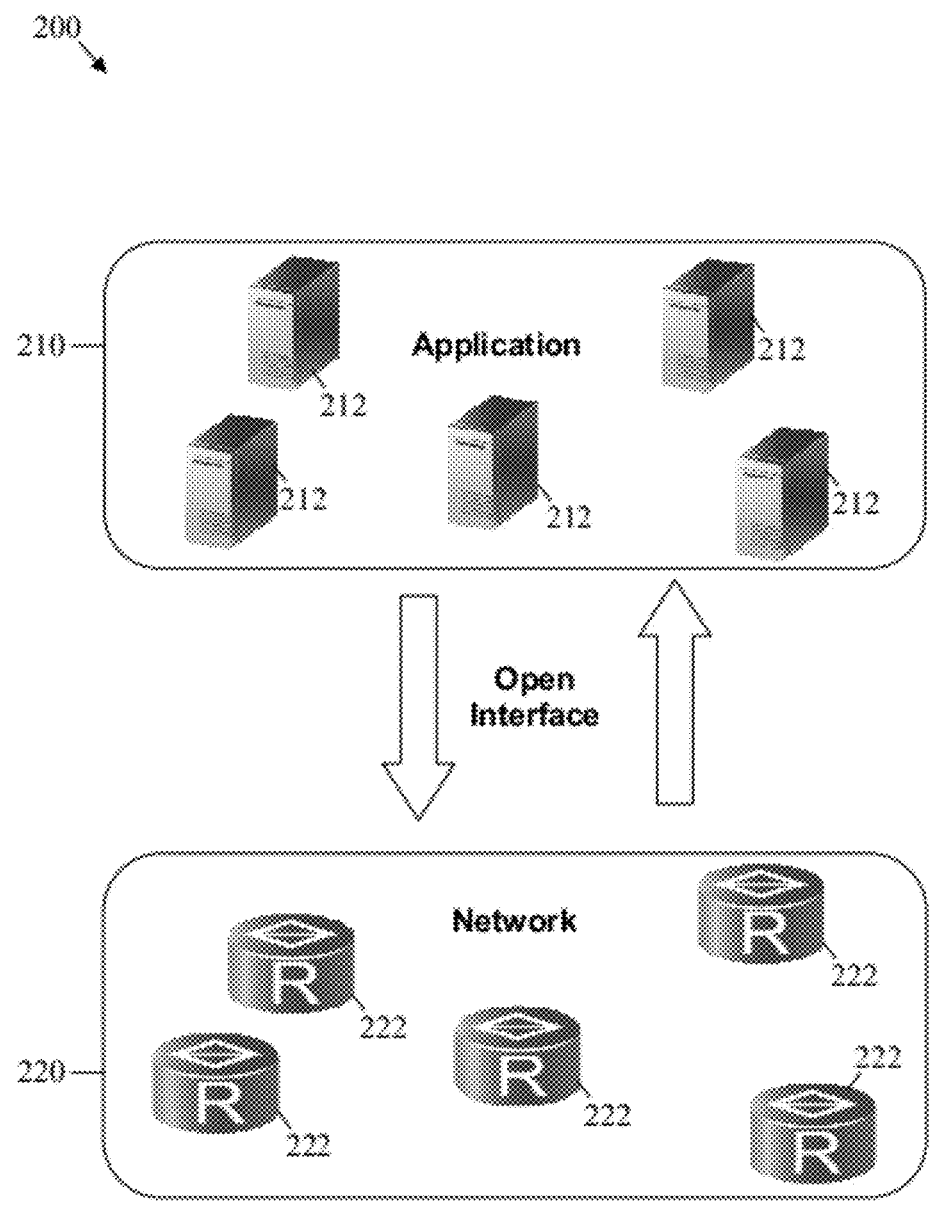
FIG. 2 is a schematic diagram of another embodiment of a CSO architecture.

FIG. 2 is a schematic diagram of another embodiment of a CSO architecture 200. The CSO architecture 200 may comprise an application stratum 210 and a network stratum 220.

The application stratum 210 may comprise a plurality of servers 212 and the network stratum 220 may comprise a plurality of network nodes 222, which may be substantially similar to the servers 112 and the network nodes 122, respectively. The CSO architecture 200 may also comprise a CSO interface that allows interactions and/or communications between the servers 212 and/or other components (not shown) of the application stratum 210 and the network nodes 222 and/or other components (not shown) of the network stratum 220. The CSO interface may be an open interface between the two strata and may enable some of the CSO features described below. At the application stratum 210, the open interface may allow client/customer identification of some type, e.g., Internet Protocol (IP) address, server types and identification, application data flows and quality of service (QoS) requirements that may be statistical in nature and vary over time, and/or server load and fault conditions. At the network stratum 220, the open interface may allow exchanging network topology, client and server locations within that topology, network capabilities and capacities with respect to QoS, bandwidth, latency information, and/or other network related features, network load and fault conditions, or combinations thereof.

Figure 3:
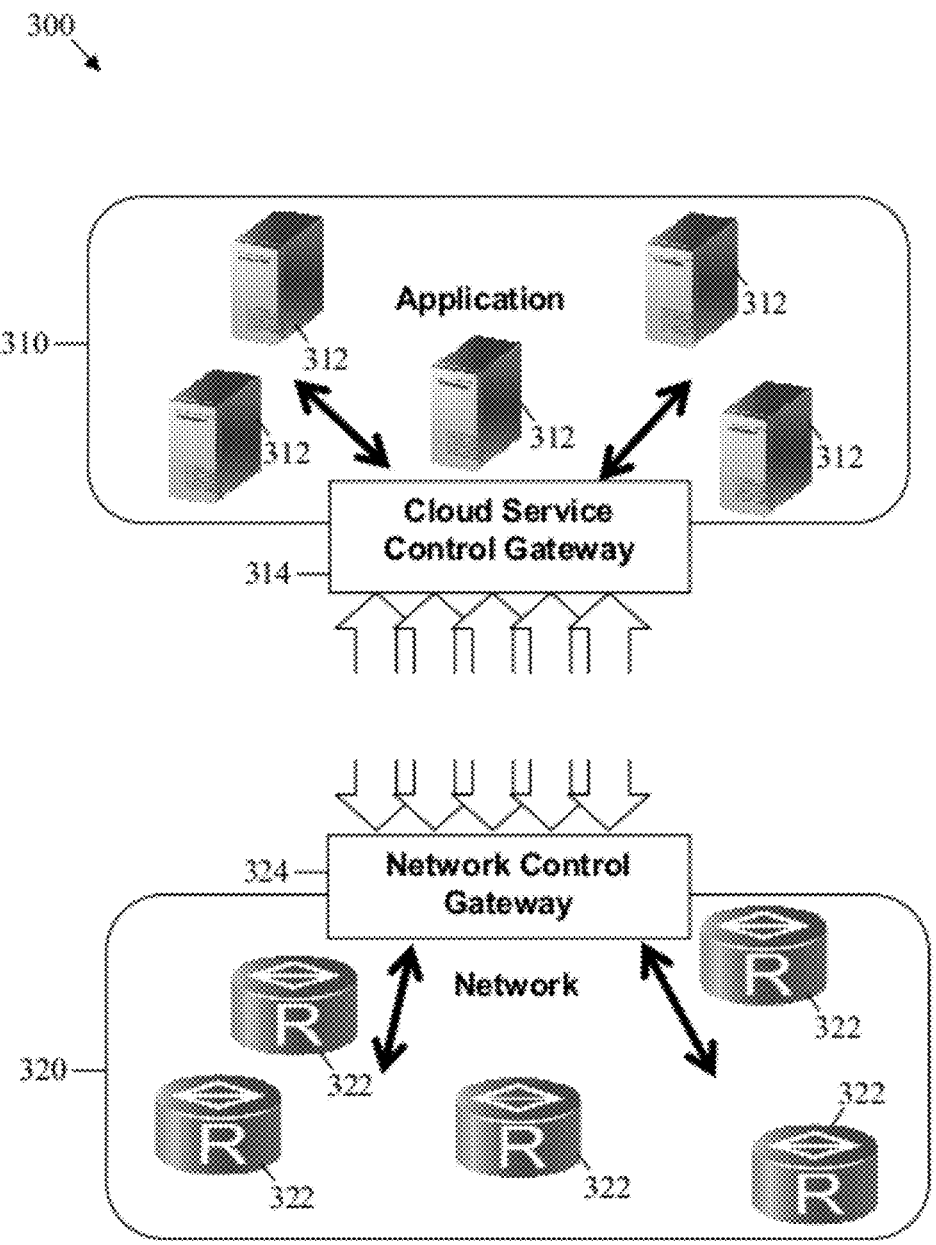
FIG. 3 is a schematic diagram of another embodiment of a CSO architecture.

FIG. 3 is a schematic diagram of another embodiment of a CSO architecture 300. The CSO architecture 300 may comprise an application stratum 310 and a network stratum 320. The application stratum 310 may comprise a plurality of servers 312 and the network stratum 320 may comprise a plurality of network nodes 322, which may be substantially similar to the servers 112 and the network nodes 122, respectively. The CSO architecture 300 may also comprise a CSO interface that may be established between a CSCG 314 at the application stratum 310 and a NCG 324 at the network stratum 320.

The CSCG 314 may be configured to access application related data and processes (at the application stratum 310), communicate with the NCG 324 (via the CSO interface), and provide information abstraction/virtualization and access limitations to external entities (outside the application stratum 310) including the network stratum 320 entities. The NCG 324 may be configured to access network related data (at the network stratum 320), communicate with the CSCG 314 (via the CSO interface), communicate with network processes such as admission control, resource reservation, and/or connection processing, and provide information abstraction/virtualization and access limitations to outside entities (outside the network stratum 320) including the application stratum 310 entities. Additionally, the CSCG 314 and the NCG 324 may communicate with the servers 312 and the network nodes 322, respectively.

Figure 4:
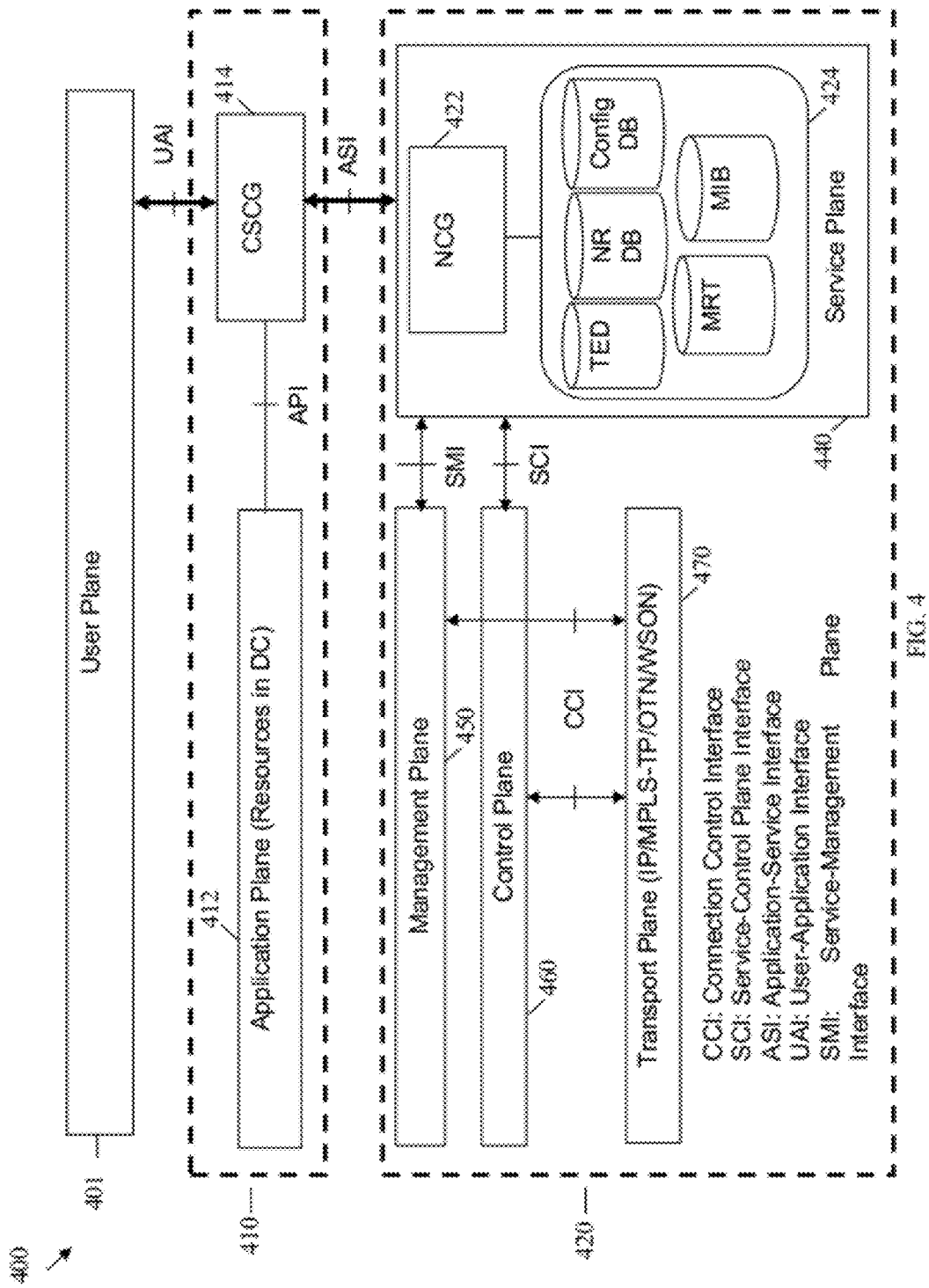
FIG. 4 is a schematic diagram of another embodiment of a CSO architecture.

FIG. 4 is a schematic diagram of another embodiment of a CSO architecture 400. The CSO architecture 400 may comprise a user plane 401, an application stratum 410, and a network stratum 420. The application stratum 410 may comprise an application plane 412 (e.g., in a data center (DC)), and an CSCG 414, which may communicate with the application plane 412 via an application plane interface (API). The CSCG 414 in the application stratum 410 may also communicate with the user plane 401 via a user-application interface (UAI). The network stratum 420 may comprise a service plane 440, a management plane 450, a control plane 460, and a transport plane 470. The transport plane 470 may support the transport technology of the corresponding network infrastructure, such as for Multiprotocol Label Switching-Transport Profile (MPLS-TP), Optical Transport Network (ONT), or Wavelength Switched Optical Network (WSON).

The service plane 440 may be configured to allow communications between the application plane 412 in the application stratum 410 and the management plane 450, control plane 460, and transport plane 470 in the network stratum 420, e.g., in an optimized manner based on CSO. The service plane 440 may communicate with the application plane 412 via an application-service interface (ASI), the management plane 450 via a service-management plane interface (SMI), and the control plane 460 via a service-control plane interface (SCI). The transport plane 470 may communicate with the management plane 450 and the control plane 460, and thus the service plane 440, via a connection control interface (CCI).

The service plane 440 may be provided by a party or entity (e.g., a provider) that may be independent of the user plane 401, the application stratum 410, and the network stratum 420. For instance, the application stratum 410 and the network stratum 420 may be managed by different entities or providers, and the service plane 440 may be managed by a third party. The service plane 440 may comprise a NCG 422, and a plurality of network service databases 424, which may comprise a Traffic Engineering Database (TED), a Network Routing (NR) Database (DB), a Config DB, a Multiple Routing Tables (MRT), a Management Information Base (MIB), and/or other networking databases. The network service databases 424 may comprise at least some information that may be copied from similar databases in the network planes. The NCG 422 may communicate with the CSCG 414, and thus the application plane 412, via the ASI, the management plane 450 via the SMI, and the control plane 460 via the SCI. The NCG 422 may also access the information in the network service databases 424 as needed to allow the flow of traffic and communications between the different planes and strata. Additional embodiments of CSO architectures may be included in U.S. Patent Publication 2012/0054346 by Y. Lee, et. al, entitled "Method and System for Cross-Stratum Optimization in Application-Transport Networks", which is incorporated by reference.

Figure 5:
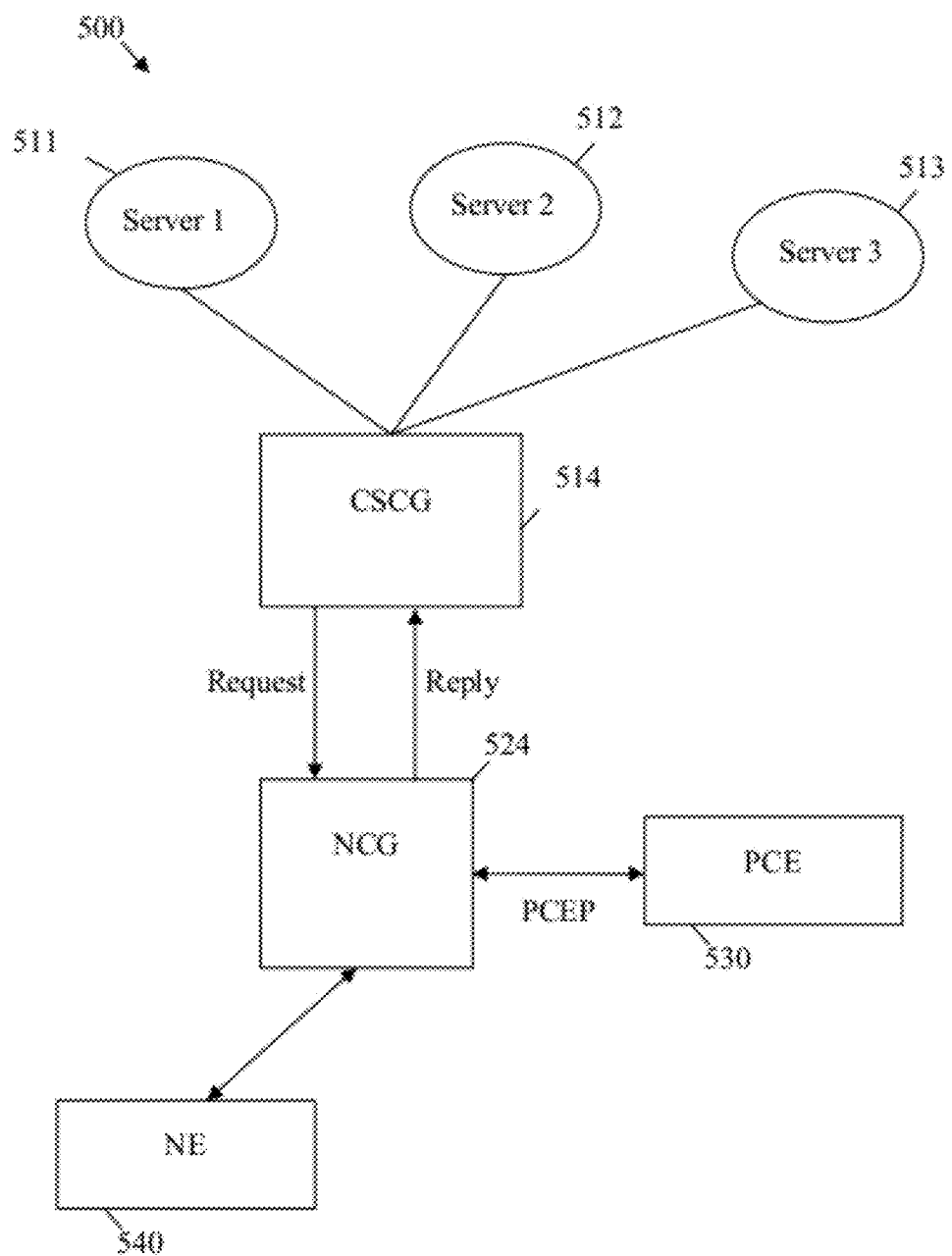
FIG. 5 is a schematic diagram of another embodiment of a CSO architecture.

FIG. 5 illustrates another embodiment of a CSO architecture 500. The CSO architecture 500 may comprise substantially the same components as CSO architectures 100-400 in a different configuration. The CSO architecture 500 may comprise a CSCG 514 in communication with Servers 511-513 and NCG 524. NCG 524 may be in communication with PCE 530 and a network element (NE) 540. The CSCG 514 and the Servers 511-513 may be positioned in the application stratum and the NCG 524, PCE 530, and NE 540 may be positioned in the network stratum.

The CSCG 514 may obtain application resource data from the Servers 511-513 on a periodic and/or on an as needed basis, and may maintain such application resource data locally for use in SS. The CSCG 514 may communicate with the Servers 511-513 using Hypertext Transfer Protocol (HTTP). The CSCG 514 may send path estimation and/or reservation requests to the NCG 524 using the Application Layer Traffic Optimization (ALTO) protocol as set forth in Internet Engineering Task Force (IETF) document draft-ietf-ALTO-protocol-11, which is incorporated by reference. The NCG 524 may in turn make path computation requests of PCE 530 using PCE communication protocol (PCEP), as described in IETF document Request for Comment (RFC) 5440, which is incorporated by reference. The RFCs 5088 and 5089, both of which are incorporated herein by reference, describe how to discover a proper PCE from the NCG's 524 perspective. The PCE 530 may provide candidate paths compliant with specific network resource constraints such as connectivity (e.g., point-to-point (P-P), point-to-multipoint (P-MP), etc.) and some QoS parameters (e.g., latency) as well as bandwidth requirement for the connectivity. The paths computed by the PCE 530 may be an estimation of the paths from the application based on the latest network link and node traffic data, which may be stored by the PCE 530 in a Traffic Engineering Database (TED). The PCE 530 may reply with the candidate paths and related network resource data. Once the paths have been found, then the NCG 524 may reply with the resulting paths and network resource data to the CSCG 514. Such paths may be sent to the CSCG 514 in source destination format or as a list of path links. If the application requires bandwidth reservation of a computed path, then the NCG 522 may proceed further with the path provisioning process either via a network management configuration process or via control plane functionality. The provisioning process may be initiated by communicating with NE 540. NE 540 may be a virtual switch, network router, control plane controller, or similar entity.

Depending on the embodiment, the CSCG 514 may select and transmit any or all of Servers' 511-513 addresses and any desired network resource constraints to NCG 524 for path computation, and NCG 524 may reply with paths meeting the CSCG's 514 requirements, allowing CSCG 514 to perform SS. Alternatively, CSCG 514 may transmit some or all of the application resource data known to the CSCG 514, along with network and/or application resource requirements, to the NCG 524, allowing NCG 524 to perform SS and inform the CSCG 514 of the results.

Figure 6:
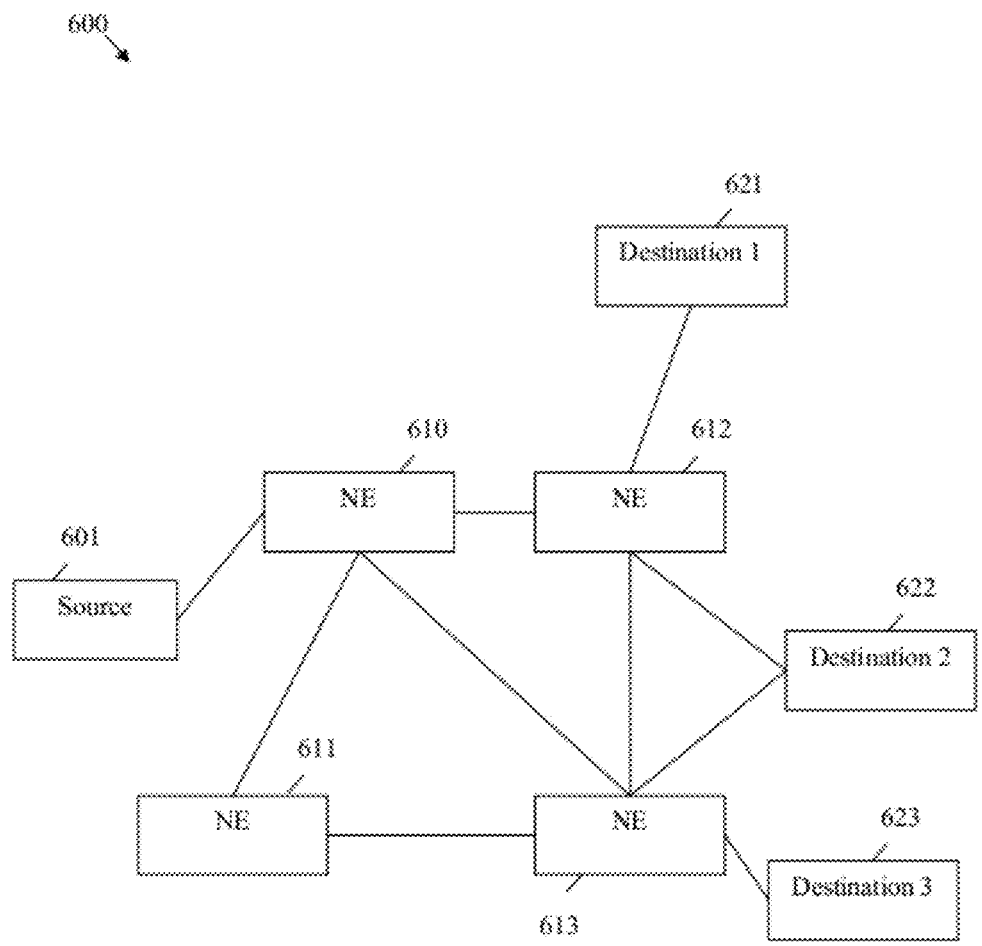
FIG. 6 is a schematic diagram of an embodiment of an example network topology map.

FIG. 6 is a schematic diagram of an embodiment of an example network topology map 600. Network topology map 600 is presented purely to provide example data for use in the methods discussed below. Network topology map 600 may comprise a Source 601 connected to Destinations 621-623 via NEs 610-613. The connections between the components of Network topology map 600 may be network links. Source 601 may comprise a server and may require a data migration to a server at Destinations 621-623. Source 601 may be connected to NE 610. NE 610 may be connected to NE 611-613. NE 613 may be connected to NE 610-612, and Destinations 622-623. NE 612 may be connected to Destinations 621-622.

Figure 7:
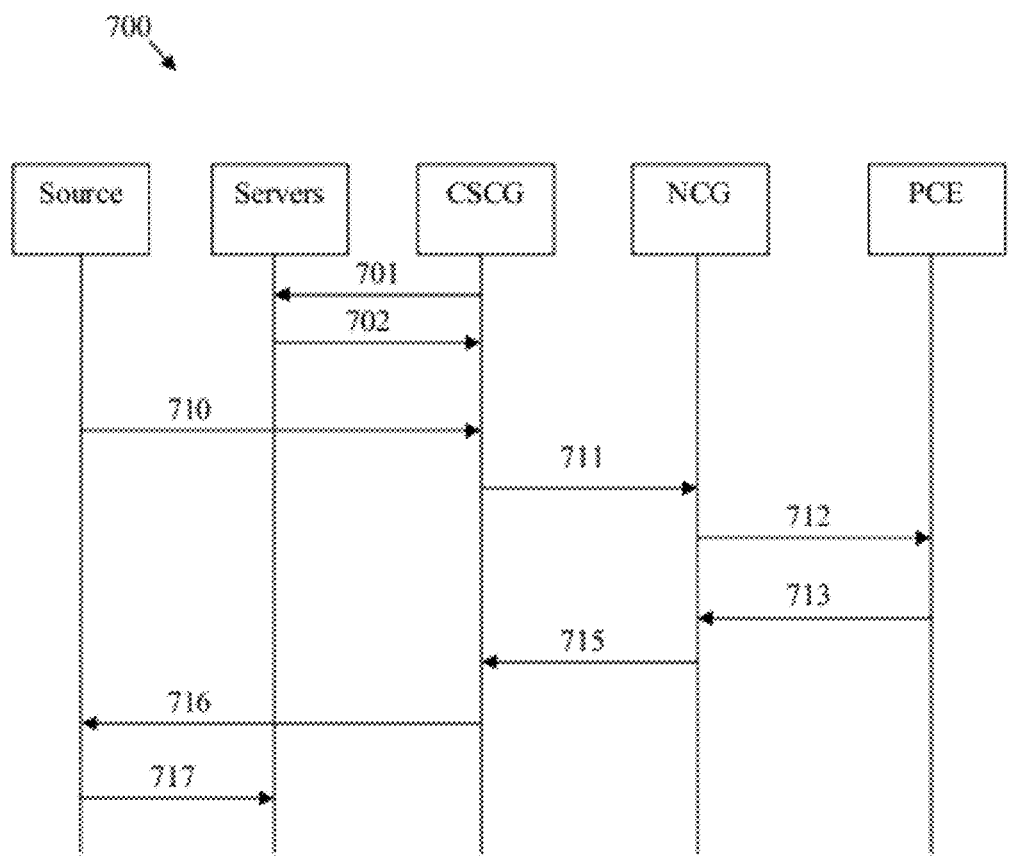
FIG. 7 illustrates an embodiment of a CSCG resource query protocol.

FIG. 7 illustrates an embodiment of a CSCG query protocol 700. A CSGC may request 701 application resource data from a plurality of servers in the application stratum. Each server may respond 702 with the server's local application resource data. The application resource data may comprise each server's ram utilization, power consumption, CPU utilization, etc. The request-response 701-702 may be performed using HTTP get/post functions. The CSGC may store the application resource data for later use. At a later time, a source (e.g Source 601) may send a data migration request 710 to the CSCG. Alternatively, the data migration request 710 may be sent to CSCG from another network component on behalf of the source. The CSCG may compare the most recent application resource data with an application resource requirement and determine the destinations that are capable of receiving the sources data and performing and related tasks (e.g. Destinations 621-623). The CSCG may determine a network resource requirement for network paths between source and the destinations. The CSCG may send a network resource query 711 to the NCG. The network resource query 711 may comprise the network address of Source 601, the network resource requirement, and a destination address list that may comprise potential data migration destinations (e.g. Destinations 621-623). The network resource query 711 may be of type summary to indicate that the CSCGW wishes to receive network resource information about each path or of type graph to indicate that the CSCGW wishes to receive network resource information about each link of each path. The NCG may transmit a path computation request 712 to a PCE, requesting an optimal path between each source-destination pair and network resource information about each optimal path. The PCE may transmit a PCE reply 713 with the paths and related network resource information. The NCG may receive the reply 713 and reject any destination with a path or path link with network resource information that does not meet the CSCG's network resource requirement. The NCG may create a network resource map that comprises the source, destinations, network paths, and/or links that are related to the CSCG's resource query 711 and meet the CSCG's network resource requirement. The network resource map may also comprise the network resource information associated with each path, each path link, or the entire network topology. The network resource map may comprise network resource information in non-abstract or abstract form. Non-abstract form may comprise actual network resource information, while abstract form may comprise network resource information in a logical/abstracted form with nonessential or duplicative data removed or combined to reduce complexity. If the resource query 711 was of type summary, the network resource map may comprise path level information, and if the resource query 711 was of type graph, the network resource map may comprise link level information. The NCG may send a reply 715 to the CSCG with the network resource map. The CSCG may select a destination server from the network resource map based on the included network resource information. The CSCG may then send a reply 716 to the data migration request 710. The reply 716 may comprise the selected destination server. The source may transfer 717 data to the destination server as needed.

Figure 8:
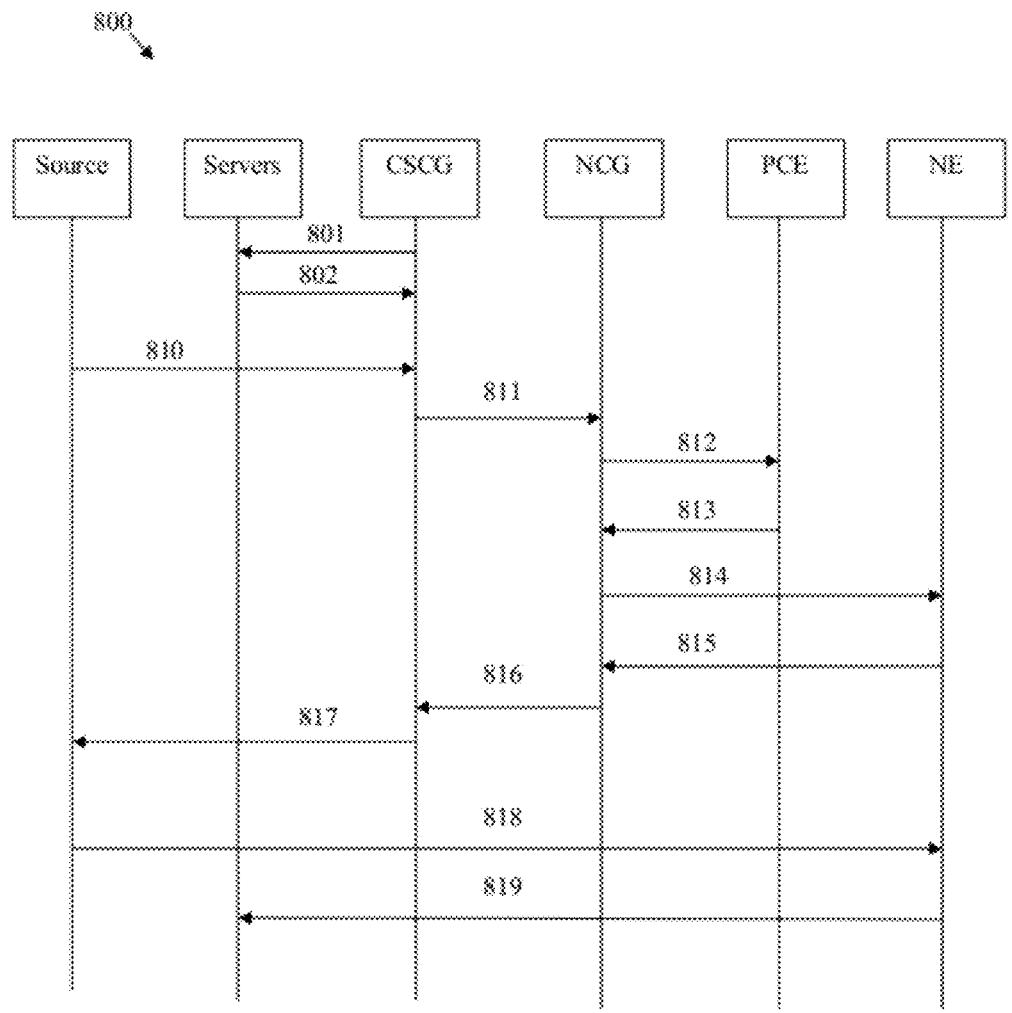
FIG. 8 illustrates an embodiment of a CSCG reservation protocol.

FIG. 8 illustrates an embodiment of a CSCG reservation protocol 800. A CSGC may request 801 application resource data from a plurality of servers in the application stratum. The servers may respond 802 with their local application resource data. A source or similar entity may send a data migration request 810 to the CSCG. The CSCG may send a reservation request 811 to the NCG. The reservation request 811 may comprise substantially the same information as the resource query 711, but may include data indicating that the NCG should complete destination server selection and reserve an appropriate data migration path. The NCG may send a path computation request 812 to a PCE and receive a path computation reply 813 in substantially the same manner as 712 and 713, respectively. The NCG may select a destination using the path resource information from the PCE and the network resource requirements from the CSCG. Alternatively, the reservation request 811 may also comprise application resource data and/or application resource requirements, and the NCG may select a destination based on both the application resource information and the network resource information. Once a path is selected, the NCG may send a path reservation request 814 to an NE capable of reserving the path, for example NE 540 and/or the path head-end or tail end node. The NE may reserve the path and send an acknowledgement 815 to the NCG. The NCG may send an acknowledgement 816 to the CSCG indicating that path and/or the paths network resource information. The CSCG may send a reply 817 to the source indicating the destination and the path. The source may begin migrating the data 818 through the NE or through a path head end node. The NE may then transfer 819 the data along the path to the destination.

Figure 9:
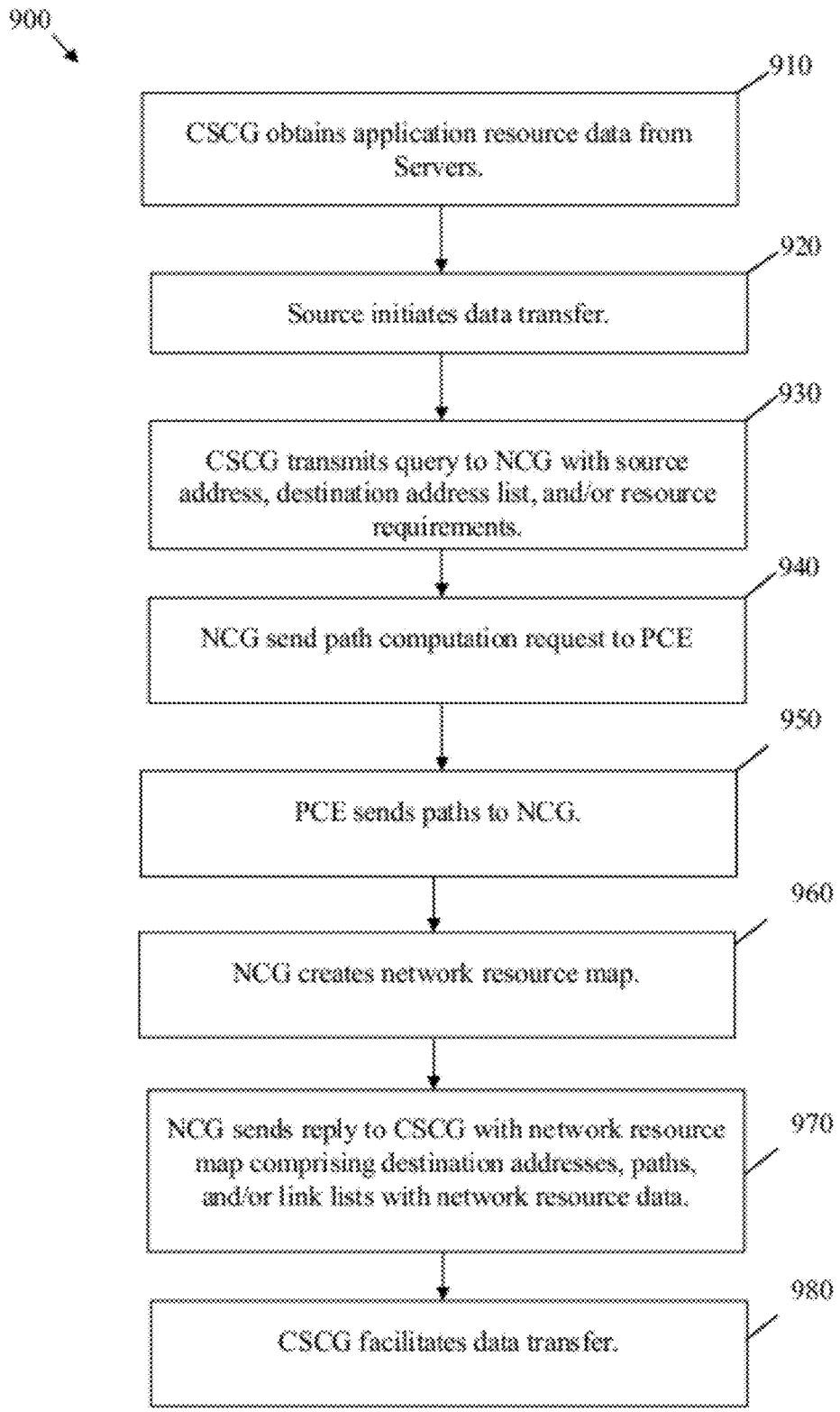
FIG. 9 is a flow chart of an embodiment of a CSCG resource query method.

FIG. 9 is a flow chart of an embodiment of a CSCG resource query method 900, which may be employed in CSCG query protocol 700. As discussed above, the CSCG may obtain 910 application resource data from data center servers. A source may then initiate 920 a data migration transfer by signaling the CSCG. The CSCG may then transmit a network resource query 930 to the NCG with a source (e.g. Source 601), the destination address list comprising potential destination servers (e.g. Destination 621-623), and network resource requirements. The NCG may send path computation requests 940 to a PCE for each source destination pair. The PCE may reply 950 to the NCG with paths for each source destination pair.

The NCG may create 960 a network resource map by rejecting any destination with a path or individual links with network resource information that does not meet the CSCG's network resource requirement. For example, CSCG may require that each path have a maximum latency of 20 and a minimum bandwidth availability of 5 in appropriate units. The paths received 950 from the PCE may be associated with the following network resource information:

| Path | BW | Latency |
| --- | --- | --- |
| Source 601-Destination 621 | 10 | 20 |
| Source 601-Destination 622 | 1 | 10 |
| Source 601-Destination 623 | 5 | 30 |

Based on the preceding data, the NCG may reject, or filter out, Destination 622 because path Source 601-Destination 622 has a bandwidth availability of one which is insufficient to meet the minimum bandwidth availability requirement of five. The NCG may also reject Destination 623 because path Source 601-Destination 623 has a latency of 30 which is in excess of and fails to meet the maximum latency requirement of 30. If the resource query 930 was of type summary, the NCG may create 960 a network resource map that comprises the path level information including Source 601, the destinations originally received by the NCG that were not filtered out, in this case Destination 621, and the network resource information associated with the accepted path or paths, in this case a bandwidth availability of 10 and a latency of 20. The NCG may filter destinations based on the cumulative resources of the path, the resources of each link in the path, or both. If the resource query 930 was of type graph, the NCG may create a network resource map that comprises each link of each path that was not filtered out and network resource information associated with each accepted link. As an example, the optimal path between Source 601 and Destination 621 may pass through NE 610 and NE 612. Link Source 601-NE 610 may have a bandwidth availability of 15 and a latency of 7, link NE 610-NE 612 may have a bandwidth availability of 10 and a latency of 8, and link NE 612-Destination 621 may have a bandwidth availability of 14 and a latency of 5, in which case path Source 601-Destination 621 has an end-to-end minimum bandwidth availability of 10 and latency of 20. If the resource query 930 was of type graph, the NCG may create 960 a network resource map with the following information:

| Link | BW | Latency |
| --- | --- | --- |
| Source 601-NE 610 | 15 | 7 |
| NE 610-NE 612 | 10 | 8 |
| NE 612-Destination 621 | 14 | 5 |

The NCG may send a reply 970 to the CSCG that comprises the network resource map with the destination addresses, paths, and/or path links with the associated network resource data. The CSCG may then facilitate 980 a data migration between the Source 601 and Destination 621.

Figure 10:
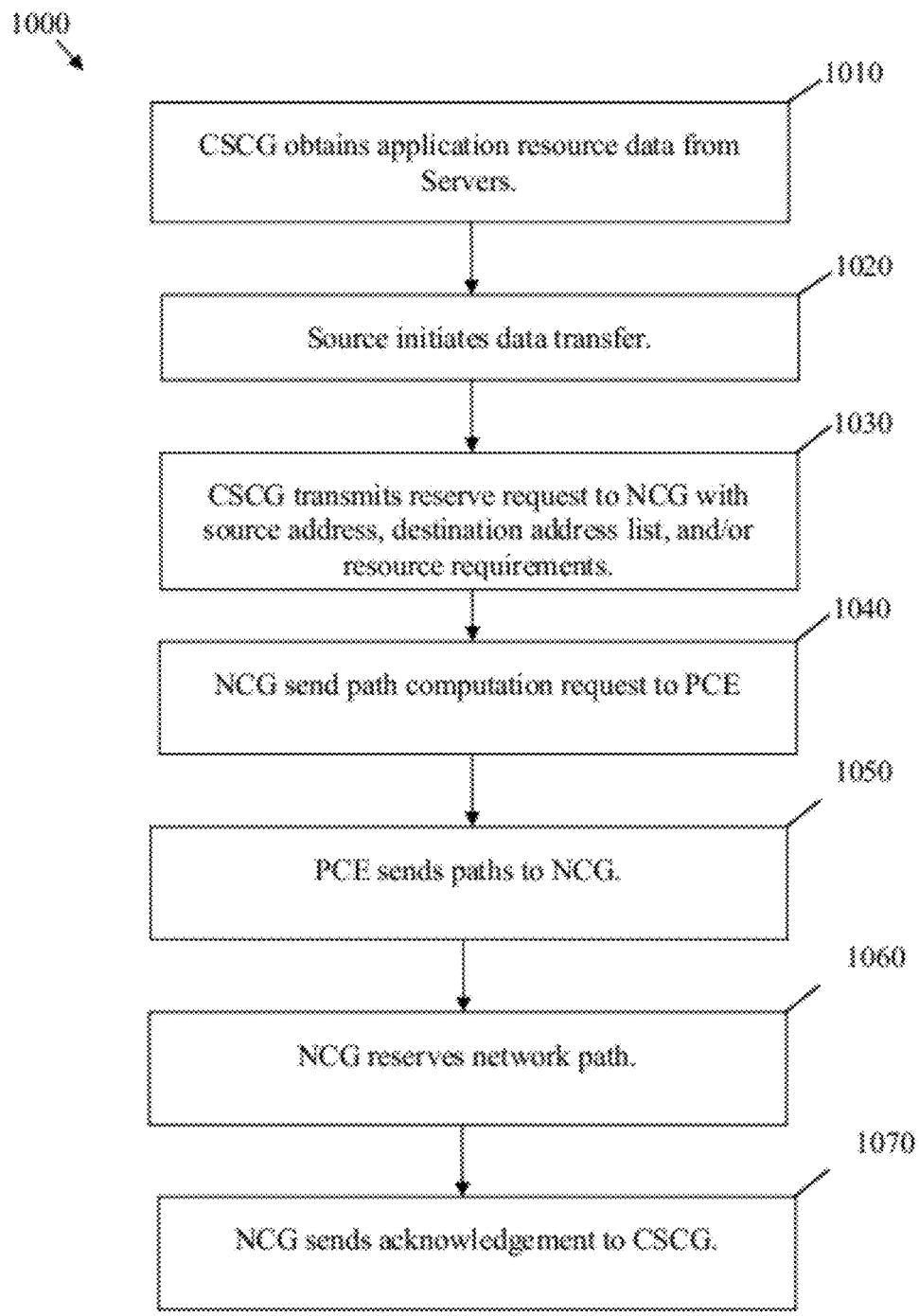
FIG. 10 is a flow chart of an embodiment of a CSCG reservation request method.

FIG. 10 is a flow chart of an embodiment of a CSCG reservation request method 1000 which may be employed in CSCG reservation protocol 800. As discussed above, the CSCG may obtain 1010 application resource data from data center servers. A source may then initiate 1020 a data migration. The CSCG may transmit 1030 a reserve request to the NCG. The reserve request may comprise the source address, the destination address list, and the network resource requirements as discussed above. The NCG may send 1040 a path computation request to a PCE, and the PCE may send 1050 computed source-destination paths and related network resource information to the NCG. The NCG may select a destination and reserve 1060 the associated network path by communicating with a NE. Upon receiving confirmation that the network path has been reserved, the NCG may send an acknowledgement 1070 to the CSCG with the reserved path.

Figure 11:
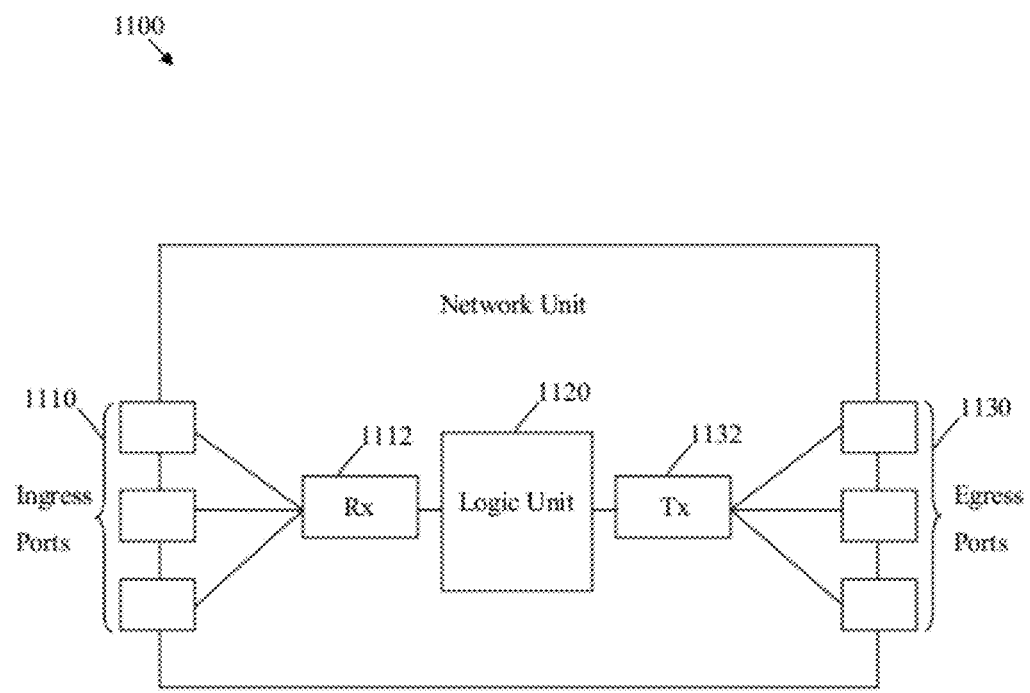
FIG. 11 is a schematic diagram of an embodiment of a network unit.

FIG. 11 illustrates an embodiment of a network unit 1100, which may be any device that transports and processes data through the network, and may comprise an NE in networks 100-600. The network unit 1100 may comprise one or more ingress ports or units 1110 coupled to a receiver (Rx) 1112 for receiving signals and frames/data from other network components. The network unit 1100 may comprise a logic unit 1120 to determine which network components to send data to. The logic unit 1120 may be implemented using hardware, software, or both. The network unit 1100 may also comprise one or more egress ports or units 1130 coupled to a transmitter (Tx) 1132 for transmitting signals and frames/data to the other network components. The receiver 1112, logic unit 1120, and transmitter 1132 may also implement or support the resource query protocol 700, the reservation protocol 800, the resource query method 900, and/or the reservation request method 1000. The components of the network unit 1100 may be arranged as shown in FIG. 11.

Figure 12:
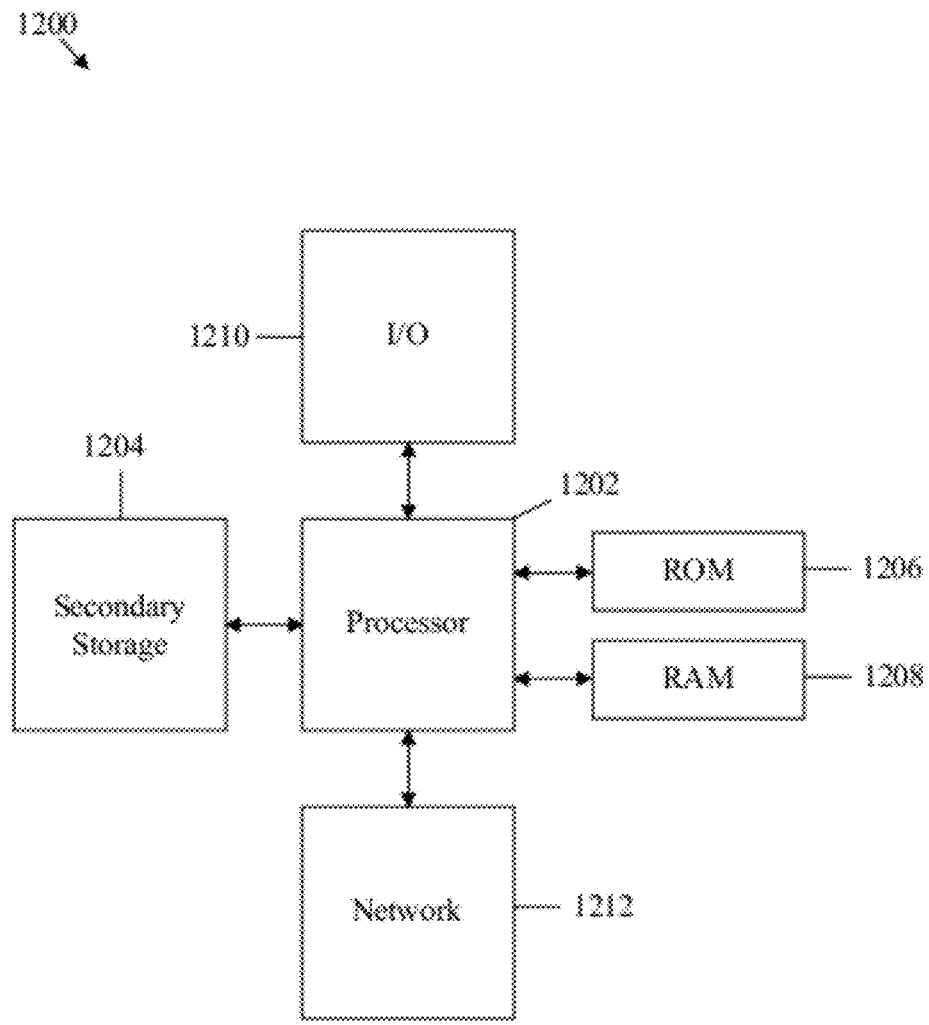
FIG. 12 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, RAM 1208, input/output (I/O) devices 1210, and network connectivity devices 1212. The processor 1202 may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to second storage 1204. The general-purpose network component 1200 may be configured to implement or support the resource query protocol 700, the reservation protocol 800, the resource query method 900, and/or the reservation request method 1000.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a cloud service control gateway (CSCG) positioned in an application stratum, wherein the method comprises:

receiving a request to migrate data from a source;

transmitting a resource query to a network control gateway (NCG) positioned in a network stratum, wherein the resource query comprises an address of the source, a list of potential destination addresses associated with potential destination servers, and a network resource requirement for computed paths extending between the source and the potential destination addresses;

after transmitting the resource query to the NCG, receiving a resource reply from the NCG, wherein the resource reply comprises a network resource map that indicates computed paths that meet the network resource requirement and that extend between the source and the potential destination addresses, and wherein the network resource map comprises:

each computed path that meets the network resource requirement and extends between the source and one of the potential destination addresses; and a path resource value based on the network resource requirement for each path in the map;

obtaining application resource data from a plurality of servers; and selecting a destination server for the data migration from the potential destination servers based on an analysis of the application resource data and path resource values.

2. The method of claim 1, wherein the resource query is transmitted using the Application Layer Traffic Optimization (ALTO) protocol.

3. The method of claim 1, wherein application resource data comprises a server's random access memory (RAM) utilization, power consumption, or central processing unit (CPU) utilization.

4. The method of claim 1, wherein the network resource requirement comprises a maximum latency for network paths between the source and the potential destination servers, and wherein the path resource values comprise actual latencies for the associated paths.

5. A method implemented in a cloud service control gateway (CSCG) positioned in an application stratum, wherein the method comprises:

transmitting a resource query to a network control gateway (NCG) positioned in a network stratum, wherein the resource query comprises an address of a data migration source, a destination address list, and a network resource requirement, and wherein the destination address list comprises data indicating network addresses of a plurality of potential data migration destination servers that meet an application resource requirement for computed paths extending between the source and the potential destination addresses;

after transmitting the resource query to the NCG, receiving a resource reply from the NCG, wherein the resource reply comprises a filtered destination list that indicates at least one potential data migration destination server from the destination address list that is associated with a network path that meets the network resource requirement and a path resource value based on the network resource requirement for each potential data migration destination server path; and selecting a destination server for the data migration by selecting at least one potential data migration destination server from the filtered destination list based on the application resource data from the application stratum and the path resource value.

6. The method of claim 5, wherein the network resource requirement comprises a maximum latency for network paths between the data migration source and the potential data migration destination servers, and wherein the path resource values comprise an actual latency for each associated path.

7. The method of claim 5, wherein application resource data comprises a server's random access memory (RAM) utilization, power consumption, or central processing unit (CPU) utilization.

8. A method implemented in a cloud service control gateway (CSCG) positioned in an application stratum, wherein the method comprises:
    receiving a request to migrate data from a source;
    transmitting a resource query to a network control gateway (NCG) positioned in a network stratum, wherein the resource query comprises an address of the source, a list of potential destination addresses associated with potential destination servers, and a network resource requirement for computed paths extending between the source and the potential destination addresses;
    after transmitting the resource query to the NCG, receiving a resource reply from the NCG, wherein the resource reply comprises a network resource map that indicates computed paths that meet the network resource requirement and that extend between the source and the potential destination addresses, and wherein the network resource map comprises:
        each link associated with each computed path that meets the network resource requirement and extends between the source and one of the potential destination addresses; and
        a network resource value based on the network resource requirement for each link of each computed path in the network resource map;
    obtaining application resource data from a plurality of servers; and
    selecting a destination server for the data migration from the potential destination servers based on an analysis of the application resource data and path resource values.

9. The method of claim 8, wherein the network resource map further comprises a network resource value for a network topology associated with the network resource map.

10. The method of claim 8, wherein the network resource requirement comprises a maximum latency for network paths between the data migration source and the potential destination servers, and wherein the path resource values comprise an actual latency for each associated link.

11. The method of claim 8, wherein application resource data comprises a server's random access memory (RAM) utilization, power consumption, or central processing unit (CPU) utilization.

12. A method implemented in a network control gateway (NCG) positioned in a network stratum, wherein the method comprises:
    receiving a resource query from a cloud service control gateway (CSCG) positioned in an application stratum, wherein the resource query comprises a network address of a data migration source, a destination address list comprising network addresses of potential data migration destination servers, and a network resource requirement for network paths extending between the data migration source and the potential data migration destination servers, wherein the network resource requirement comprises a maximum latency for network paths between the data migration source and the potential data migration destination servers; and
    transmitting a path computation request to a path computation element (PCE) positioned in the network stratum, wherein the path computation request directs the PCE to compute a plurality of network paths between the source address and the potential destination addresses;
    receiving a path computation response from the PCE, wherein the path computation response comprises the computed network paths and at least one resource value based on the network resource requirement for each computed network path; and
    transmitting, to the CSCG, data indicating the potential data migration destination addresses from the destination address list that are associated with network paths that meet the network resource requirement and data indicating a path resource value based on the network resource requirement for each network path that meets the network resource requirement.

13. The method of claim 12, wherein the potential data migration destination addresses are transmitted to the CSCG as a second potential destination address list.

14. The method of claim 12, wherein the potential data migration destination addresses are transmitted to the CSCG as a network resource map.

15. The method of claim 12, wherein the path resource values comprise an actual latency for each associated path.

16. A method implemented in a network control gateway (NCG) positioned in a network stratum, wherein the method comprises:
    receiving a resource query from a cloud service control gateway (CSCG) positioned in an application stratum, wherein the resource query comprises a network address of a data migration source, a destination address list comprising network addresses of potential data migration destination servers, and a network resource requirement; and
    transmitting a path computation request to a path computation element (PCE) positioned in the network stratum, wherein the path computation request directs the PCE to compute a plurality of network paths between the source address and the potential destination addresses;
    receiving a path computation response from the PCE, wherein the path computation response comprises the computed network paths and a resource value associated with each computed network path; and
    transmitting, to the CSCG, data indicating the potential data migration destination addresses with network paths that meet the network resource requirement,
    wherein the potential data migration destination addresses are transmitted to the CSCG as a network resource map, and
    wherein the network resource map further comprises data indicating each link of a network topology.

17. The method of claim 16, wherein the network resource map further comprises data indicating the resource value for each link of the network path, and wherein the resource value comprises an available bandwidth and a latency.

18. A method implemented in a network control gateway (NCG) positioned in a network stratum, wherein the method comprises:
    receiving, via an Application Layer Traffic Optimization (ALTO) protocol, a resource reservation request from a cloud service control gateway (CSCG) positioned in an application stratum, wherein the resource reservation request comprises a data migration source address, a list of potential data migration destination addresses, and a first network resource requirement for computed paths extending between the data migration source address and the potential data migration destination addresses, and wherein the resource reservation request directs the NCG to reserve a path between the source address and at least one of the destination addresses such that the path meets the first network resource requirement; and transmitting a path computation request to a path computation element (PCE) positioned in the network stratum, wherein the path computation request directs the PCE to compute a plurality of network paths between the source address and the destination addresses such that each computed path meets the first network resource requirement received from the CSCG.

19. The method of claim 18, wherein the resource reservation request further comprises a second network resource requirement for computed paths extending between the source and the potential destination addresses, wherein the path computation request further directs the PCE to compute the network paths such that each computed path also meets the second network resource requirement received from the CSCG, and wherein the method further comprises:

receiving a path computation reply from the PCE comprising at least one computed network path between the source and at least one of the potential destination addresses that meets the network resource requirements from the CSCG;

selecting at least one of the potential destination addresses received from the PCE as a destination server for a migration from the source address based on network resource data received from the PCE; and transmitting a path reservation request to a network node positioned on a computed network path associated with the selected destination server.

20. The method of claim 19, wherein the first network resource requirement comprises a maximum latency for network paths between the data migration source address and the potential data migration destination addresses, and wherein the second network resource requirement comprises a minimum bandwidth for network paths between the data migration source address and the potential data migration destination addresses.

21. The method of claim 18, further comprising: when the path reservation request succeeds, transmitting a reservation acknowledgement to the CSCG by employing the ALTO protocol.

22. The method of claim 21, wherein the reservation acknowledgement comprises data indicating the reserved path, data indicating the selected destination server, and data indicating resource values based on the network resource requirements for the reserved path for each.

* * * * *